United States Patent
Inoue et al.

(10) Patent No.: US 6,869,902 B2
(45) Date of Patent: Mar. 22, 2005

(54) SILICON NITRIDE POROUS BODY AND METHOD OF MANUFACTURING THE SAME

(75) Inventors: Katsuhiro Inoue, Ama-gun (JP); Kenji Morimoto, Kasugai (JP); Masaaki Masuda, Nagoya (JP); Shinji Kawasaki, Nagoya (JP); Hiroaki Sakai, Nagoya (JP)

(73) Assignee: NGK Insulators, Ltd. (JP)

( * ) Notice: Subject to any disclaimer, the term of this patent is extended or adjusted under 35 U.S.C. 154(b) by 14 days.

(21) Appl. No.: 10/311,980

(22) PCT Filed: Jun. 25, 2002

(86) PCT No.: PCT/JP02/02826

§ 371 (c)(1),
(2), (4) Date: Dec. 23, 2002

(87) PCT Pub. No.: WO02/076909

PCT Pub. Date: Oct. 3, 2002

(65) Prior Publication Data

US 2004/0023789 A1 Feb. 5, 2004

(30) Foreign Application Priority Data

Mar. 26, 2001 (JP) ........................................ 2001-087911

(51) Int. Cl.$^7$ ............................................. C04B 35/591
(52) U.S. Cl. .................... 501/97.1; 501/97.2; 501/97.3; 502/200; 264/628; 264/647; 264/659
(58) Field of Search ............................... 501/97.1, 97.2, 501/97.3; 502/200; 264/628, 647, 659

(56) References Cited

U.S. PATENT DOCUMENTS

| | | | | |
|---|---|---|---|---|
| 5,618,765 A | * | 4/1997 | Takeuchi et al. | 501/80 |
| 5,695,700 A | * | 12/1997 | Takeuchi et al. | 264/626 |
| 5,696,042 A | * | 12/1997 | Matsuura et al. | 264/628 |
| 5,780,374 A | * | 7/1998 | Kawai et al. | 501/97.1 |
| 6,143,677 A | * | 11/2000 | Miyanaga et al. | 501/97.4 |
| 6,565,797 B2 | * | 5/2003 | Miyakawa et al. | 264/628 |
| 6,593,261 B2 | * | 7/2003 | Shinohara et al. | 501/97.1 |

FOREIGN PATENT DOCUMENTS

| | | | |
|---|---|---|---|
| GB | 1546928 | * | 5/1979 |
| JP | 52-121613 | | 10/1977 |
| JP | 7-309669 | | 11/1995 |
| JP | 9-67167 | | 3/1997 |
| JP | 2001-1293315 | * | 10/2001 |

OTHER PUBLICATIONS

Translation of Japanese document 9–067167, Mar. 1997.*

* cited by examiner

Primary Examiner—Karl Group
(74) Attorney, Agent, or Firm—Parkhurst & Wendel, L.L.P.

(57) ABSTRACT

A silicon nitride porous body (5) obtained by nitriding a molded body having metallic silicon (3) as a main component, the porous body having a porous structure with an average pore diameter of 3 μm or above, and wherein the total content of silicon and nitrogen is 95% or above and the nitridation ratio of silicon is 90% or above. The silicon nitride porous body has a porous structure with a large average pore diameter, with a test specimen cut out from the porous body exhibiting large thermal conductivity and a small thermal expansion coefficient, and can be suitably used in a component for purifying gas and/or solution such as a ceramic filter.

16 Claims, 1 Drawing Sheet

SILICON NITRIDE POROUS BODY AND METHOD OF MANUFACTURING THE SAME

TECHNICAL FIELD

The present invention relates to a silicon nitride porous body and a method of manufacturing the same. In more detail, the present invention relates to a silicon nitride porous body, which is mainly composed of the silicon nitride grains produced by use of nitriding reaction of a metallic silicon powder, has a porous structure with a large average pore diameter, from which a test specimen cut exhibits a large thermal conductivity and a small thermal expansion coefficient, and which is suitably used as a component for purifying gas and/or solution such as a ceramic filter, and an efficient method of manufacturing the same.

BACKGROUND ART

Silicon nitride is superior to other ceramics in heat resistance, strength, fracture toughness, and the like, and hence a porous body made thereof is expected to be used as a component for purifying gas and/or solution such as a ceramic filter (for example, a honeycomb structure in a device for purifying an exhaust gas of an internal combustion engine, and the like).

However, silicon nitride is higher in raw material price as compared to other ceramics, and furthermore high in sintering temperature so that the production cost thereof inevitably becomes high. Accordingly, although silicon nitride has excellent characteristics as described above, it has not yet come into wide use, as affairs stand.

On the other hand, metallic silicon (Si) is lower in price compared to silicon nitride, and a number of methods have been attempted in which metallic silicon is nitrided by use of nitriding reaction, that is an exothermic reaction to obtain a silicon nitride sintered body. As a method for obtaining a silicon nitride sintered body based on such a reaction sintering method, there is disclosed, for example, a method of obtaining a silicon nitride sintered from a fine Si powder (Japanese Patent Laid-Open No. 52-121613).

In such a reaction sintering method using metallic silicon, generally sintering is made while nitriding by allowing a nitrogen gas to react with a molded body consisting of a mixture composed of a metallic silicon powder and a silicon nitride powder. A silicon nitride sintered body thus obtained is excellent in thermal shock resistance, abrasion resistance, high electric resistance, and chemical stability, and also excellent in that the dimensional change during the reaction sintering is so small that a sintered body having a high degree of dimensional precision can be obtained (during the reaction sintering, the weight increases by about 60%, but the dimensional change is small, so that a relatively fine sintered body can be obtained with almost the same dimension and shape as those of the molded body before the reaction sintering).

However, when such a silicon nitride sintered body is applied to a component for purifying gas and/or solution such as a ceramic filter (for example, a honeycomb structure in a device for purifying an exhaust gas of an internal combustion engine, and the like), in order to improve a filter characteristic and a purification characteristic, it is necessary to control the sintered body so as to have a porous structure with a large open porosity and a large pore diameter. When a silicon nitride porous structure is obtained by use of the nitriding reaction of metallic silicon, for the purpose of obtaining a porous body having a high open porosity, the nitriding treatment of a metallic silicon molded body having a low molded body density yields a porous structure in which fine silicon nitride fibers are generated not only on a surface but also in an interior, to yield a porous body small in pore diameter. In a porous body having a small pore diameter, a permeability coefficient becomes small, so that a high pressure is required for permeation of gas or solution. For example, for a solution system, a feed pump capacity needs to be increased.

In addition, when a porous body small in pore diameter is used for an exhaust gas purifying device, a back pressure becomes high to degrade an engine performance. Moreover, when a catalyst is loaded on a porous body, it is possible to obtain a product having a high purification ratio by using a carrier with a large open porosity and a large pore diameter.

The present invention was achieved in consideration of the above described problems, and takes as its object the provision of a silicon nitride porous body, which has a porous structure with a large average pore diameter, from which a test specimen cut out exhibits a large thermal conductivity and a small thermal expansion coefficient, and which is suitably used as a component for purifying gas and/or solution such as a ceramic filter, and an efficient method of manufacturing the same.

DISCLOSURE OF THE INVENTION

The present inventors have perfected the present invention, by finding a condition, which can control for obtaining an optimal porous structure, on a basis of a nitriding reaction of metallic silicon, as a result of diligent study for obtaining a silicon nitride porous body which has a porous structure optimal for use in a component for purifying gas and/or solution such as a ceramic filter.

In other words, the present invention provides the following silicon nitride porous body and the following method of manufacturing the same.

[1] A silicon nitride porous body which is obtained by nitriding a molded body having metallic silicon as a main component, characterized by having a porous structure with an average pore diameter of 3 $\mu$m or above, a total content of silicon and nitrogen being 95% or above, and a nitridation ratio of silicon being 90% or above.

[2] The silicon nitride porous body according to the above [1], wherein a test specimen cut out therefrom has thermal conductivity of 10 W/m·K or above and a thermal expansion coefficient of 3.5 ppm/° C. or below.

[3] The silicon nitride porous body according to the above [1] or [2], wherein a content of oxygen is smaller than 1%.

[4] The silicon nitride porous body according to any of the [1] to [3], wherein an open porosity is 30% or above.

[5] A method of manufacturing a silicon nitride porous body by nitriding a molded body having metallic silicon as a main component, characterized by; preparing the molded body having metallic silicon as a main component, removing a surface oxide of metallic silicon by performing atmospheric control before nitriding the obtained molded body having metallic silicon as a main component, and subsequently introducing a nitrogen gas and nitriding metallic silicon to yield the silicon nitride porous body.

[6] The method of manufacturing a silicon nitride porous body according to the above [5], wherein the metallic silicon is granular, and an average grain diameter thereof is 10 $\mu$m or above.

[7] The method of manufacturing a silicon nitride porous body according to the above [5], wherein; a grain diameter distribution of grains in the metallic silicon is a distribution with double maximums of a first peak located on a larger grain diameter side and a second peak located on a smaller grain diameter side, a width of the first peak is smaller than a width of the second peak, and the first peak is located between 30 and 300 μm while the second peak is located in a range of ⅕ to ⅟₅₀ relative to the location of the first peak.

[8] A ceramic filter characterized by being made of the silicon nitride porous body according to any of the above [1] to [4].

[9] A component for purifying gas and/or solution characterized by having a structure of loading a catalyst on a surface of the silicon nitride porous body according to any of the above [1] to [4].

[10] A component for purifying gas characterized by having a structure of loading a NOx storage catalyst on a surface of the silicon nitride porous body according to any of the [1] to [4].

BEST MODE FOR CARRYING OUT THE INVENTION

Figure 1A:
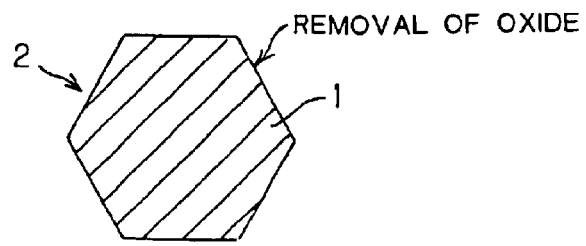
FIGS. 1(a)–(d) are explanatory diagrams schematically showing a nitriding mechanism in the method of manufacturing a silicon nitride porous body of the present invention.

Specific description will be made on the embodiments of the silicon nitride porous body and the method of manufacturing thereof of the present invention.

A silicon nitride porous body of the present invention is a silicon nitride porous body obtained by nitriding a molded body having metallic silicon as a main component, and which is characterized by having a structure with an average pore diameter of 3 μm or above, preferably 5 μm or above, and a total content of silicon and nitrogen being 95% or above, preferably 99% or above, and a nitridation ratio of silicon being 90% or above, preferably 95% or above.

In this connection, the "nitriding metallic silicon" will be described below.

In addition, the "total content of silicon and nitrogen" means the sum of a total mass % of silicon and a total mass % of nitrogen both obtained by chemical analysis. The "molded body having metallic silicon as a main component" means a molded body obtained by molding metallic silicon (for example, a metallic silicon powder (grains)) by a powder molding such as slip casting, injection molding, tape molding, extrusion molding, press molding, or the like; and which can contain an auxiliary agent such as an oxide, a nitride, a fluoride, a carbonate, a nitrate, or the like as a secondary component, but a total amount of the secondary component does not exceed a content of the metallic silicon powder.

When a highly pure metallic silicon is used, it is possible to obtain a porous body in which a total content of silicon and nitrogen is 99% or above after nitriding treatment. Depending on the intended purpose, an inexpensive metallic silicon powder having a large amount of impurities can be used as a starting raw material. In this case, when the total content of silicon and nitrogen is 95% or above, it is possible to obtain a highly functional silicon nitride porous body. For example, in the present invention, $SiO_2$ on a surface of metallic silicon grains is removed by atmospheric control, and hence metallic silicon containing a large amount of oxygen can also be used as a starting material. Such a metal as Fe or Ti has a function to accelerate a nitriding reaction, and hence a moderate content of such a metal is acceptable (for example, a content of 2% or below). On the other hand, Al degrades thermal conductivity significantly when contained in silicon nitride, and hence a content thereof is preferably smaller than 0.5%.

As above, even when a metallic silicon powder having a purity of 95% or above is used, it is possible to obtain a highly functional and highly reliable silicon nitride porous body, providing that a total content of silicon and nitrogen is 95% or above.

The "nitridation ratio" is a value calculated from X-ray diffraction intensities of metallic silicon and silicon nitride, and signifies a ratio of conversion from metallic silicon to silicon nitride. The higher is the nitridation ratio, that is, the smaller is a residual amount of metallic silicon, it is possible to obtain a silicon nitride porous body in which a thermal expansion is the smaller, and thermal conductivity is the higher.

An average pore diameter of a porous structure in a silicon nitride porous body of the present invention is 3 μm or above. With the average pore diameter is smaller than 3 μm, a characteristic of the porous body is degraded when used in a purifying component such as a filter (with decreasing pore diameter, a permeability coefficient is decreased as proportional to a squared pore diameter, and hence a large pore diameter is essential for use as a filter). There is no particular upper limit to the average pore diameter, but strength is degraded with the average pore diameter exceeding 100 μm.

In the silicon nitride porous body of the present invention, a total content of silicon and nitrogen is 95% or above. With the total content of silicon and nitrogen smaller than 95%, an impurity content is sufficiently high to degrade a characteristic owing to a grain boundary phase ascribable to the impurity. For example, there is obtained a silicon nitride porous body in which thermal conductivity is decreased or a high temperature strength becomes poor.

In the silicon nitride porous body of the present invention, the nitridation ratio of silicon is 90% or above. When the nitridation ratio is smaller than 90%, a thermal expansion coefficient becomes high. When a residual amount of metallic silicon is large, a high temperature strength is degraded.

As for the silicon nitride porous body of the present invention, thermal conductivity of a test specimen cut out from the porous body is preferably 10 W/m·K or above, more preferably 20 W/m·K or above. With the thermal conductivity smaller than 10 W/m·K, the porous body sometimes becomes a porous body poor in thermal shock resistance.

In addition, a thermal expansion coefficient of a test specimen cut out from the porous body is preferably 3.5 ppm/° C. or below, more preferably 3 ppm/° C. or below. With the thermal expansion coefficient exceeding 3.5 ppm/° C., the porous body sometimes becomes a porous body poor in thermal shock resistance.

As for the silicon nitride porous body of the present invention, a content of oxygen as an impurity is preferably smaller than 1%, more preferably 0.15% or below. With the oxygen content of 1% or above, sometimes the porous body has a porous structure having a lot of fibrous grains and a small pore diameter. With the oxygen content of 0.15% or below, it is possible to obtain a porous body having a further larger pore diameter and higher thermal conductivity.

An open porosity of a porous structure in the silicon nitride porous body of the present invention is preferably 30% or above, more preferably 40% or above. With the open porosity smaller than 30%, a purification characteristic is sometimes degraded when used in a purifying component such as a filter (With the open porosity smaller than 30%, for example, when used in a filter, sometimes a pressure becomes so high that a system requires a large load. In addition, an effective space becomes scarce, and hence efficiency as a purifying device is sometimes degraded when loading a catalyst.).

A method of manufacturing a silicon nitride porous body of the present invention is a method which obtains a silicon nitride porous body by nitriding a molded body having metallic silicon as a main component, and is characterized by preparing a molded body having metallic silicon as a main component, removing a surface oxide of metallic silicon by atmospheric control before nitriding the obtained molded body having metallic silicon as a main component, and subsequently introducing a nitrogen gas and nitriding metallic silicon, to yield the silicon nitride porous body.

In the method of manufacturing a silicon nitride porous body of the present invention, when a molded body is made to be high in open porosity, it is possible to obtain a porous sintered body which has a high open porosity as taken over from the molded body.

Metallic silicon used in the method of manufacturing a silicon nitride porous body of the present invention is granular, and an average grain diameter thereof is 10 µm or above, preferably 30 µm or above. When a molded body is prepared using metallic silicon smaller than 10 µm in the average grain diameter, sintering of metallic silicon occurs before nitriding. When a porous body is formed with small grains, a pore diameter becomes small.

As for metallic silicon grains used in the method of manufacturing a silicon nitride porous body of the present invention, it is preferable that a grain diameter distribution thereof is a distribution with double maximums of a first peak located on a larger grain diameter side and a second peak located on a smaller grain diameter side, for the purpose of improving a moldability when a molded body is formed and obtaining a porous body large in open porosity.

Furthermore, it is preferable that a width of the first peak is smaller than a width of the second peak, the first peak is located between 30 and 300 µm, and the second peak is located in the range of 1/5 to 1/50 relative to the location of the first peak, for the purpose of obtaining a porous body large both in open porosity and in pore diameter.

By controlling a granular state of metallic silicon used, it is possible to control a state of molded body, which is before nitriding and has metallic silicon as a main component, to be optimal. Thus, it is possible to proceed nitriding easily, and the high open area ratio can be maintained even after nitriding.

However, when a molded body having metallic silicon as a main component with such a high open porosity as described above is nitrided as it is, silicon nitride fibers are formed not only on a surface but also in an interior of the metallic silicon molded body; there occurs a problem that a porous body, in which silicon nitride fibers are formed, becomes small in pore diameter, so that a pressure loss becomes larger when a gas permeates.

The formation mechanism of such silicon nitride fibers is interpreted as that an oxide on a surface of metallic silicon is evaporated as a SiO gas to react with a nitrogen gas to deposit and grow as fibrous silicon nitride.

It is possible to obtain a silicon nitride porous body having no formation of fibrous structure through removing a surface oxide of metallic silicon by performing atmospheric control before nitriding a molded body having metallic silicon as a main component, as in the method of manufacturing a silicon nitride porous body of the present invention.

Here, the "atmospheric control" means performing control so as to allow the atmosphere inside of a furnace, in which a molded body is placed, in a condition that a SiO gas can be easily evaporated, and specifically, evacuation can be cited as the most convenient method. A strongly reductive gas such as $H_2$ or $NH_3$ may be introduced. A substance absorbing oxygen in the atmosphere such as metallic Ti or Zr may be placed in a sintering furnace together with the molded body. In addition, a material with which a SiO gas reacts easily, for example, an alkaline earth oxide such as CaO, may be placed in a sintering furnace.

Figure 1B:
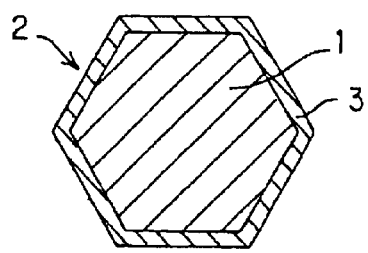
Figure 1C:
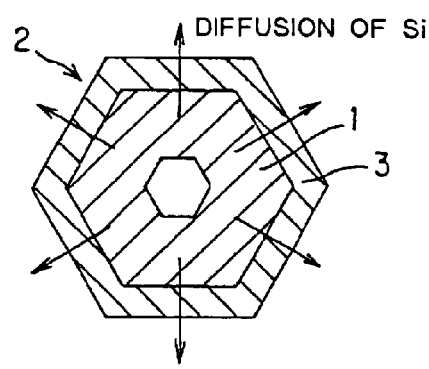
Figure 1D:
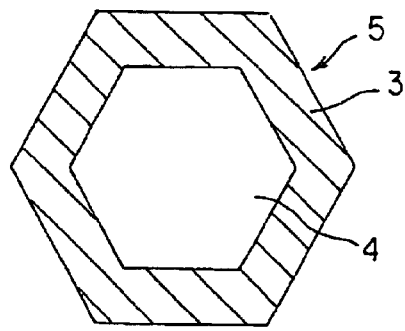

Furthermore, a nitriding mechanism of the method of manufacturing a silicon nitride porous body of the present invention is interpreted as follows: as shown in FIGS. 1(a) to 1(d); when nitrogen 2 is introduced onto a surface of metallic silicon 1 from which surface an oxide has been removed (FIG. 1(a)), a nitride film 3 is formed on a surface of metallic silicon 1 (FIG. 1(b)); simultaneously when a non-nitrided inner metallic silicon 1 passes through the formed nitride film 3 and diffuses outward, metallic silicon 1 is successively nitrided on the surface of the nitride film 3 and is deposited as silicon nitride to increase a thickness of the nitride film 3 (FIG. 1(c)); and finally, the whole metallic silicon grain used is nitrided to form a silicon nitride porous body 5 which has a cavity 4 having the same size as that of the original metallic silicon grain and has a thick deposited nitride film 3 (FIG. 1(d)).

In the method of manufacturing a silicon nitride porous body of the present invention, a silicon nitride porous body having large thermal conductivity can be obtained, as described below.

The silicon nitride used in the method of manufacturing a silicon nitride porous body of the present invention is an excellent material in improving thermal conductivity. In other words, a non-oxide ceramic, inclusive of silicon nitride, such as aluminum nitride or carbon nitride is generally higher in thermal conductivity than an oxide ceramic such as cordierite or alumina, and is excellent in improving thermal conductivity, so that by using such a material it is possible to obtain a silicon nitride porous body large in thermal conductivity.

Furthermore, in the case where silicon nitride is obtained by nitriding reaction using a metallic silicon as a starting material, when oxygen is present on a surface of metallic silicon, oxygen remains in silicon nitride to degrade thermal conductivity; but in the method of manufacturing a silicon nitride porous body of the present invention, because of nitriding after removal of the oxygen on the surface of metallic silicon, a silicon nitride porous body having large thermal conductivity can be obtained.

As described above, the silicon nitride porous body of the present invention has a porous structure composed of such highly pure silicon nitride grains as a content of oxygen (impurity) thereof is smaller than 1%, and accordingly can have a small thermal expansion coefficient. In this way, owing to a small thermal expansion coefficient, a porous body excellent in thermal shock resistance can be provided, which can be suitably used in a component used at a high temperature for purifying gas and/or solution, such as a heat-resistant filter and a catalyst carrier.

In addition, the silicon nitride porous body of the present invention is composed of a low-impurity silicon nitride in which a nitridation ratio is as high as 90% or above and a total content of silicon and nitrogen is 95% or above, and accordingly it can be a porous body with a large strength and Young's modulus, although both an open porosity and a pore diameter are large in such a way that the open porosity is 30% or above and the pore diameter is 3 $\mu$m or above. By using a silicon nitride porous body of the present invention, it is possible to provide a highly reliable component for purifying gas and/or solution. In addition, even when a silicon nitride porous body which has a large pore diameter exceeding 10 $\mu$m and a high porosity exceeding 50% is manufactured by adding a pore forming agent such as starch or cellulose, there can be provided a highly reliable porous body component wherein a reduction of a strength or Young's modulus is suppressed.

A ceramic filter of the present invention is characterized by being made of the above described silicon nitride porous body.

In addition, a component for purifying gas and/or solution of the present invention is characterized by having a structure of loading a catalyst on a surface of the above described silicon nitride porous body.

In this case, as for the catalyst, there is no particular restriction, and for example, a NOx storage catalyst can be cited.

When a body large in thermal conductivity such as the silicon nitride porous body of the present invention is used as a catalyst carrier in a component for purifying gas and/or solution such as a ceramic filter, the catalytic performance can be fully displayed, since thermal uniformity and thermal shock resistance thereof become excellent.

Further specific description will be made below with reference to Examples, but these Examples do not imply any restrictions as to the present invention.

in the air, and then the molded body was subjected to the nitriding treatment in an electric furnace capable of atmospheric control under the conditions shown in Table 1, and a sintered body was obtained. From the obtained sintered body, test specimens of 4×3×40 mm, ϕ10×3 mm, and the like were cut out, and were subjected to measurements of the following evaluation items, and the results are shown in Table 1.

Porosity: measured by the method of weight in water.

Pore diameter distribution: measured with a porosimeter using mercury.

Thermal conductivity: measured by a laser flash method.

Thermal expansion coefficient: measured with a push rod differential thermodilatometer.

Four-point bending strength: measured with a test specimen cut out in the shape of 4×3×40 mm in conformity with JIS R 1601.

Young's modulus: measured in conformity with JIS R 1602 by the strain gauge method at the time of measuring the four-point bending strength.

Total content of silicon and nitrogen: in conformity with JIS R 1603, the total content of the silicon was determined by a combined method of condensation weight and absorption photometry, the total content of the nitrogen was determined by the inert gas fusion-thermal conductivity method, and the sum of the contents of silicon and nitrogen was obtained.

Nitridation ratio: calculated from the X-ray diffraction intensities for (102) and (210) of $\alpha Si_3N_4$, (101) and (210) of $\beta Si_3N_4$, and (111) and (311) of Si.

Specific surface area: measured by the gas adsorption BET method.

TABLE 1

| | Examples | | | | | | Comparative Examples | | | |
|---|---|---|---|---|---|---|---|---|---|---|
| | 1 | 2 | 3 | 4 | 5 | 6 | 1 | 2 | 3 | 4 |
| First keeping temperature (° C.) | 1350 | 1400 | 1300 | 1350 | 1350 | 1350 | 1000 | 1000 | 1450 | 1200 |
| Time (h) | 2 | 0.1 | 1 | 2 | 2 | 1 | 0.1 | 2 | 0.1 | 2 |
| Atmosphere | $10^{-2}$ Torr | $10^{-1}$ Torr | $10^{-5}$ Torr | $10^{-2}$ Torr | Ar + $H_2$ | Ar + $H_2$ | $N_2$ | $10^{-2}$ Torr | $10^{-2}$ Torr | $10^{-2}$ Torr |
| Second keeping temperature (° C.) | 1200 | 1200 | 1300 | 1000 | 1200 | 1100 | 1200 | 1000 | 1200 | 1100 |
| Time (h) | 0.1 | 0.5 | 0.1 | 0.2 | 0.1 | 0.1 | 0.1 | 0.1 | 0.1 | 0.1 |
| Atmosphere | Vacuum →$N_2$ | Vacuum →$N_2$ | Vacuum →$N_2$ | Vacuum →$N_2$ | Ar + $H_2$ →$N_2$ | Ar + $H_2$ →$N_2$ + $H_2$ | $N_2$ | Vacuum →$N_2$ | Vacuum →$N_2$ | Vacuum →$N_2$ |
| Third keeping temperature (° C.) | 1450 | 1450 | 1450 | 1400 | 1400 | 1400 | 1450 | 1450 | 1450 | 1450 |
| Time (h) | 5 | 5 | 5 | 10 | 20 | 5 | 10 | 10 | 1 | 5 |
| Atmosphere | $N_2$ | $N_2$ | $N_2$ | $N_2$ | $N_2$ | $N_2$ + $H_2$ | $N_2$ | $N_2$ | $N_2$ | $N_2$ |
| Open porosity (%) | 46 | 45 | 47 | 45 | 48 | 47 | 43 | 43 | 25 | 46 |
| Average pore diameter ($\mu$m) | 7 | 6 | 5 | 5 | 8 | 7 | 1 | 1 | 3 | 1 |
| Total content of silicon and nitrogen (%) | 99.1 | 99.2 | 99.3 | 99.0 | 99.4 | 99.6 | 97.2 | 97.8 | 99.4 | 98.1 |
| Nitridation ratio (%) | 95 | 96 | 95 | 97 | 98 | 98 | 94 | 95 | 88 | 94 |
| Specific surface area ($m^2$/g) | 0.3 | 0.3 | 0.4 | 0.4 | 0.2 | 0.3 | 1.2 | 1.0 | 0.8 | 0.9 |

EXAMPLES 1 TO 6 AND COMPARATIVE EXAMPLES 1 TO 4

Polyvinyl alcohol (PVA) (2 parts by volume) was added as a molding aid to a metallic silicon powder with the average pore diameter of 30 $\mu$m (100 parts by volume), and a molded body was prepared using a metal mold press. The molding aid was removed from the molded body at 500° C.

As can be seen from Table 1, as for the porous body obtained in Comparative Example 2, the first retention temperature was as low as 1000° C., the removal of $SiO_2$ was insufficient, and the interior whisker was generated, so that it became a porous body having a small pore diameter (1 $\mu$m); as for the porous body obtained in Comparative Example 3, the first retention temperature was 1450° C. and close to the melting point of metallic silicon, the sintering proceeded, so that a porous body having a small open porosity was formed before nitriding treatment, and hence even after the nitriding treatment the open porosity did not exceed 30%, the nitriding time was short, and the nitridation ratio did not exceed 90%.

In addition, in any of the porous bodies obtained in Comparative Examples, fibers (whiskers) were generated, so that the pore diameter became small, and the specific surface area became larger as compared to those obtained in Examples.

Table 2 shows a comparison of the contents of oxygen in the sintered bodies obtained in Example 1 and Comparative Example 1 with the content of oxygen in the raw material. As can be seen from Table 2, the sintered body obtained in Example 1 is remarkably smaller in the content of oxygen than the sintered body of Comparative Example 1.

TABLE 2

|  | Raw material | Example 1 | Comparative Example 1 |
|---|---|---|---|
| Content of oxygen (mass %) | 0.2 | 0.05 | 0.2 |

EXAMPLES 7 TO 10 AND COMPARATIVE EXAMPLES 5 AND 6

The effect of a granular shape of the metallic nitrogen raw material used was examined. As in Example 1, polyvinyl alcohol (PVA) (2 parts by volume) was added as a molding aid to the metallic silicon powder shown in Table 3 (100 parts by volume), and a molded body was prepared using a metal mold press. The molding aid was removed from the molded body at 500° C. in the air, and then the molded body was subjected to the nitriding treatment in an electric furnace capable of atmospheric control as in Example 1, and a sintered body was obtained. From the obtained sintered body, the test specimens of 4×3×40 mm and φ10×3 mm were cut out, and were subjected to measurements of the evaluation items shown in Table 3, and the results are shown in Table 3. Incidentally, the results for the case of Example 1 are also shown together.

TABLE 3

|  | Examples | | | | | Comparative Examples | |
|---|---|---|---|---|---|---|---|
|  | 1 | 7 | 8 | 9 | 10 | 5 | 6 |
| Si grain diameter (μm) | | | | | | | |
| Grain diameter first peak | 30 | 15 | 52 | 98 | 210 | 5 | 350 |
| Grain diameter second peak | — | — | 4 | 12 | 10 | — | — |
| Open porosity (%) | 46 | 48 | 46 | 42 | 41 | 30 | 40 |
| Average pore diameter (μm) | 7 | 5 | 5 | 5 | 9 | 2 | 25 |
| Thermal conductivity (W/m · K) | 21 | 23 | 22 | 25 | 23 | 20 | 10 |
| Thermal expansion coefficient (ppm/° C.) | 2.8 | 2.8 | 2.9 | 2.8 | 3.0 | 2.9 | 3.1 |
| Four-point bending strength (MPa) | 55 | 50 | 65 | 60 | 50 | 70 | 5 |
| Young's modulus (GPa) | 60 | 55 | 65 | 70 | 50 | 80 | 6 |

TABLE 3-continued

|  | Examples | | | | | Comparative Examples | |
|---|---|---|---|---|---|---|---|
|  | 1 | 7 | 8 | 9 | 10 | 5 | 6 |
| Total content of silicon and nitrogen (%) | 99.1 | 98.5 | 99.3 | 99.2 | 99.4 | 95.8 | 99.1 |
| Nitridation ratio (%) | 96 | 98 | 95 | 96 | 92 | 95 | 70 |

EXAMPLES 11 AND 12

Methyl cellulose (10 parts by volume) and water (40 parts by volume) were added to the metallic silicon powder shown in Table 4 (100 parts by volume), and furthermore a surfactant (1 part by volume) was added, and the material for use in extrusion was prepared by using a kneading machine. The honeycomb structure was molded by using a plunger type extrusion machine. The obtained honeycomb molded body was subjected to the nitriding treatment in an electric furnace capable of atmospheric control as in Example 1, and a sintered body was obtained. A portion of the sintered body was cut out and the open porosity and average pore diameter were measured as in Example 1. A test specimen of honeycomb rib thickness was cut out from the sintered body and the thermal conductivity was measured by the laser method and the thermal expansion coefficient was measured by the push rod differential type method. The results are shown in Table 4.

COMPARATIVE EXAMPLES 9 AND 10

Sintered bodies were obtained as in Examples 11 and 12 except that the details of the nitriding treatment in Examples 11 and 12 were altered in such a way that without performing the vacuum treatment but with flowing the nitrogen gas, the temperature was elevated from room temperature and elevated from 1200° C. up to 1450° C. at a rate of 50° C./h and kept at 1450° C. for 5 hours. In the obtained sintered bodies, the silicon nitride whiskers were generated so that the microstructure became small in pore diameter.

Test specimens were cut out from the obtained sintered bodies and subjected to the evaluations as in Examples 11 and 12, the obtained results being shown in Table 4.

EXAMPLES 13 AND 14

An acrylic resin binder (35 parts by volume) and a plasticizer (3 parts by volume) were added to the metallic silicon powder shown in Table 4 (100 parts by volume), and toluene (55 parts by volume) and isopropyl alcohol (30 parts by volume) as solvents were added thereto, and a slurry was prepared by using a pot mill. A tape of 200 μm in thickness was molded by using a doctor blade molding machine. The tape molded body was subjected to the nitriding treatment in an electric furnace capable of atmospheric control. The obtained tape molded body was subjected to the nitriding treatment in an electric furnace capable of atmospheric control as in Example 1, and a sintered body was obtained. A portion of the obtained sintered body was cut out, and the open porosity and the average pore diameter were measured, as in Example 1. In addition, a thin plate test specimen was cut out from the obtained sintered body, and the thermal conductivity was measured by the laser method and the thermal expansion coefficient was measured by the push rod differential type method. The obtained results are shown in Table 4.

COMPARATIVE EXAMPLES 11 AND 12

Sintered bodies were obtained as in Examples 13 and 14 except that the details of the nitriding treatment in Examples 13 and 14 were altered in such a way that without performing the vacuum treatment but with flowing the nitrogen gas, the temperature was elevated from room temperature, and elevated from 1200° C. up to 1450° C. at a rate of 50° C./h and kept at 1450° C. for 5 hours. In the obtained sintered bodies, the silicon nitride whiskers were generated so that the microstructure became small in pore diameter.

Test specimens were cut out from the obtained sintered bodies and subjected to the evaluations as in Examples 13 and 14, the results being shown in Table 4.

TABLE 4

| | Examples | | | | Comparative Examples | | | |
|---|---|---|---|---|---|---|---|---|
| | 11 | 12 | 13 | 14 | 9 | 10 | 11 | 12 |
| Molding method | Extrusion | Extrusion | Tape | Tape | Extrusion | Extrusion | Tape | Tape |
| Si powder ($\mu$m) | | | | | | | | |
| Grain diameter first peak | 15 | 98 | 30 | 75 | 15 | 98 | 30 | 75 |
| Grain diameter second peak | — | 12 | — | 8 | — | 12 | — | 8 |
| Open porosity (%) | 49 | 44 | 47 | 46 | 48 | 47 | 46 | 45 |
| Average pore diameter ($\mu$m) | 6 | 6 | 6 | 6 | 1 | 2 | 1 | 2 |
| Thermal conductivity (W/m · K) | 22 | 25 | 21 | 25 | 20 | 19 | 18 | 19 |
| Thermal expansion coefficient (ppm/° C.) | 2.8 | 2.9 | 2.8 | 2.9 | 2.9 | 3.0 | 3.0 | 2.9 |
| Total content of silicon and nitrogen (%) | 98.7 | 99.3 | 99.1 | 99.4 | 97.2 | 97.6 | 97.4 | 97.7 |
| Nitridation ratio (%) | 97 | 95 | 97 | 96 | 96 | 92 | 95 | 93 |

INDUSTRIAL APPLICATION

As described above, as a result of the present invention, there can be provided a silicon nitride porous body, which has a porous structure with a large open porosity and a large average pore diameter, from which a test specimen cut out exhibits large thermal conductivity and a small thermal expansion coefficient, and which is suitably used as a component for purifying gas and/or solution such as a ceramic filter, and an efficient method of manufacturing the same porous body.

What is claimed is:

1. A silicon nitride porous body which is obtained by nitriding a molded body having metallic silicon as a main component, wherein the silicon nitride porous body has a porous structure with an average pore diameter of 3 $\mu$m or above, a total content of silicon and nitrogen being 95% or above, and a nitridation ratio of silicon being 90% or above.

2. The silicon nitride porous body according to claim 1, wherein a test specimen cut out therefrom has a thermal conductivity of 10 W/m·K or above and a thermal expansion coefficients of 3.5 ppm/° C. or below.

3. The silicon nitride porous body according to claim 1, wherein a content of oxygen is smaller than 1%.

4. The silicon nitride porous body according to claim 1, wherein an open porosity is 30% or above.

5. A method of manufacturing a silicon nitride porous body by nitriding a molded body having metallic silicon as a main component, comprising;

preparing the molded body having metallic silicon as a main component, removing a surface oxide of metallic silicon by performing atmospheric control before nitriding the obtained molded body having metallic silicon as a main component, and subsequently introducing a nitrogen gas and nitriding metallic silicon to yield the silicon nitride porous body wherein a grain diameter distribution of grains in the metallic silicon is a distribution with double maximums of a first peak located on a larger grain diameter side and a second peak located on a smaller grain diameter side, a width of the first peak is smaller than a width of the second peak, and the first peak is located between 30 and 300 m while the second peak is located in a range of ⅕ to ¹⁄₅₀ relative to the location of the first peak.

6. The method of manufacturing a silicon nitride porous body according to claim 5, wherein the metallic silicon is granular, and an average grain diameter thereof is 10 $\mu$m or above.

7. A ceramic filter comprising the silicon nitride porous body according to claim 1.

8. A component for purifying gas and/or solution comprising a structure of loading a catalyst on a surface of the silicon nitride porous body according to claim 1.

9. A component for purifying gas and/or solution according to claim 8, comprising a structure of loading a NOx storage catalyst on a surface of the silicon nitride porous body.

10. The silicon nitride porous body according to claim 2, wherein a content of oxygen is smaller than 1%.

11. The silicon nitride porous body according to claim 2, wherein the open porosity is 30% or above.

12. The silicon nitride porous body according to claim 3, wherein the open porosity is 30% or above.

13. The silicon nitride porous body according to claim 10, wherein the open porosity is 30% or above.

14. A ceramic filter comprising the silicon nitride porous body according to claim 2.

15. A ceramic filter comprising the silicon nitride porous body according to claim 3.

16. A ceramic filter comprising the silicon nitride porous body according to claim 4.

* * * * *